E. A. SCHREIBER.
COUPLING FOR RAILWAY TRAIN PIPES.
APPLICATION FILED OCT. 5, 1914.

1,351,875.

Patented Sept. 7, 1920.
7 SHEETS—SHEET 1.

WITNESSES:
H. M. Gillespie
J. B. Lagons, Jr.

INVENTOR.
Edward A. Schreiber
BY Barnett & Truman
ATTORNEYS.

E. A. SCHREIBER.
COUPLING FOR RAILWAY TRAIN PIPES.
APPLICATION FILED OCT. 5, 1914.

1,351,875.

Patented Sept. 7, 1920.
7 SHEETS—SHEET 2.

WITNESSES:
H. M. Gillespie
J. B. Lagomo Jr.

INVENTOR.
Edward A. Schreiber
BY
Barnett & Truman
ATTORNEYS.

E. A. SCHREIBER.
COUPLING FOR RAILWAY TRAIN PIPES.
APPLICATION FILED OCT. 5, 1914.

1,351,875.

Patented Sept. 7, 1920.

WITNESSES:
H. M. Gillespie
J. B. Lagorio Jr.

INVENTOR.
Edward A. Schreiber
BY Barnett Truman
ATTORNEYS

UNITED STATES PATENT OFFICE.

EDWARD A. SCHREIBER, OF CHICAGO, ILLINOIS, ASSIGNOR, BY MESNE ASSIGNMENTS, TO VAPOR CAR HEATING COMPANY, INC., A CORPORATION OF NEW YORK.

COUPLING FOR RAILWAY-TRAIN PIPES.

1,351,875.   Specification of Letters Patent.   Patented Sept. 7, 1920.

Application filed October 5, 1914. Serial No. 865,161.

*To all whom it may concern:*

Be it known that I, EDWARD A. SCHREIBER, a citizen of the United States, residing at Chicago, in the county of Cook and State of Illinois, have invented certain new and useful Improvements in Couplings for Railway-Train Pipes, of which the following is a specification.

My invention relates to a flexible coupling for the train pipes, either steam or air, carried by the cars of a railway train. The primary object of the invention is to provide an all-metal train pipe coupling, to take the place of the usual rubber hose, which will be durable, sufficiently flexible to accommodate itself to the relative movements between the ends of the cars, on rough track, for example, or in going around curves, and to permit the ready manipulation of the coupler heads in coupling and uncoupling; and which, furthermore, will be relatively inexpensive to manufacture, will be and remain steam or air tight, and will be capable of withstanding the high pressures (and temperatures, in the case of steam line couplings) to which train pipe couplings are subjected.

While some efforts have been made to substitute jointed metallic structures for rubber hose in the couplings used in steam and air train lines, so far as I am aware, the metal couplings have not proven generally satisfactory. In any event, they have not, in any general sense, supplanted the rubber hose which latter are used almost universally in this connection. However, there are serious objections to the use of rubber hose in train pipe couplings. They are costly, last but a short time, and are very unreliable. The rubber begins to disintegrate in a short time. It is particularly easily affected by the high temperature of the steam in couplings used on steam lines. The constant vibration, and also the high pressures to which the hose are subjected, also tend to rapidly weaken and destroy them. Rubber hose in a train line are also objectionable because when they begin to disintegrate the pieces of rubber detached therefrom are blown through the train pipes by the steam or air and clog up the valves or strainers. Furthermore, when a rubber hose is subjected to high pressure, and on a steam train line the pressure may be one hundred pounds per square inch or over, they become very stiff and unyielding. My invention provides a coupling made entirely of metal which is, to all intents and purposes, as flexible as those made up of rubber hose, in fact, more flexible at high pressures, and which has none of the objectionable features above mentioned.

A further object of the invention is to provide a coupling in which the range of vertical movement of the coupler heads corresponding to the relative movements of the ends of the cars in rounding curves, is reduced to a minimum. Couplers of the gravity type are almost exclusively used today for coupling up the steam train pipes of a railroad train. In this type of coupler the co-engaging heads are coupled together by the downward swinging movement and are uncoupled by a swinging or pivotal movement in the opposite direction. The engagement is maintained by the weight of the coupler heads. The standard practice is to have the steam line coupling extend diagonally across the space between the cars in one direction and to have the coupling or couplings for the air line or lines extend diagonally across the space above the steam line coupling and at about right angles thereto. When the ends of the car draw together, particularly on a curve which shortens the distance between the end valves, the steam line coupling necessarily moves down toward the roadbed. To accommodate for this a certain clearance has to be arranged for between the normal position of the steam line coupling and the track. On the other hand, if the steam line coupling, in its normal position, is raised too high above the track it is likely to be drawn up against the coupling or couplings of the air line or lines and open the same. This may happen in case the ends of the cars assume a position which increases the distance between the steam line end valves while decreasing the distance between the end valves and the air line. My invention provides a form of coupling in which the range of vertical movement of the coupler heads is so slight in comparison with the range of movements which the coupler heads have when connected to the end valves by rubber hose, that the danger of the steam line couplers interfering with the air line coupling is wholly obviated.

A further object of the invention is to provide elastic means for holding the coupler head up out of contact with the roadbed when uncoupled, for example, in the case of the coupling member on the last car of the train. It has been customary in such case to support the coupler head with a chain. If the trainman forgets to make this attachment the coupler is likely to drop and be pulled along the track when the train moves and so be destroyed or injured. The elasticity of the means which I employ for preventing this is for the purpose of permitting the swinging movement of the coupler head in coupling and uncoupling.

The invention has for further objects the other new and improved constructions, arrangements and devices relating to train pipe couplings to be hereinafter described and claimed.

The invention further provides a novel form of universal joint for use in connection with fluid conduits which may have utility, I apprehend, in other structures than a train pipe coupling.

The invention is illustrated in the accompanying drawings wherein—

Like characters of reference designate like parts in the several figures of the drawings.

Figure 1:
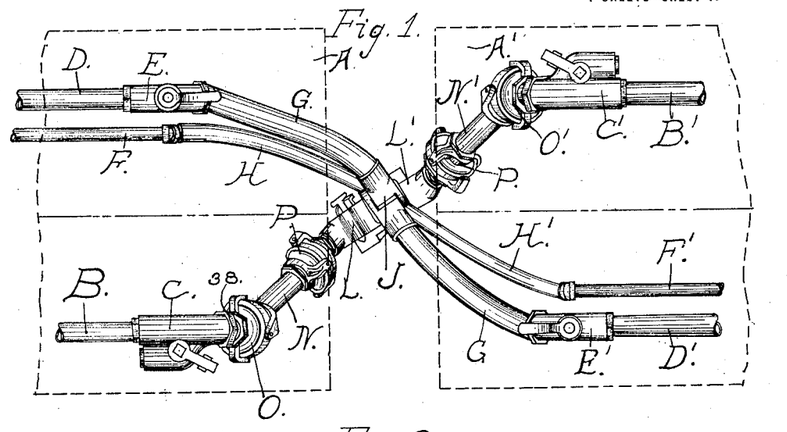
Figure 1 is a plan view of a steam train pipe coupling embodying my invention in a preferred form, the figure showing also the positions of the air line couplings with respect to the coupling for the steam line; the couplings being in their normal positions, that is, with the cars in alinement with each other.
Figure 2:
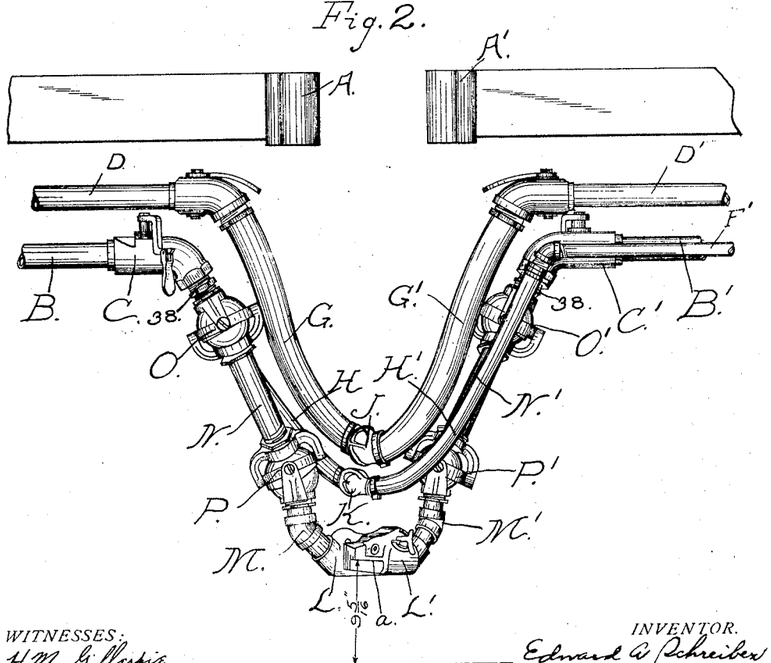
Fig. 2 is a side elevation of the structures shown in Fig. 1.

In the drawings the dotted line figures, designated A, A', represent the adjacent ends of two cars of a railroad train. B, B' are the steam train pipes provided with the usual end valves C, C'. D, D' (Figs. 1 and 2) are the train pipes of the air line for the air brake system, these pipes terminating in end valves E, E'. F, F' are the pipes constituting the signal air line.

My invention is illustrated as embodied in a coupling for the steam line. The air train pipes D, D', F, F', are shown as coupled up by means of rubber hose G, G', H, H', which are provided with the usual interlocking couplers J and K. I wish it to be understood, however, that it would be possible to construct the air train pipe couplings in accordance with my invention as well as the steam line coupling.

Figures 7, 8, 9:
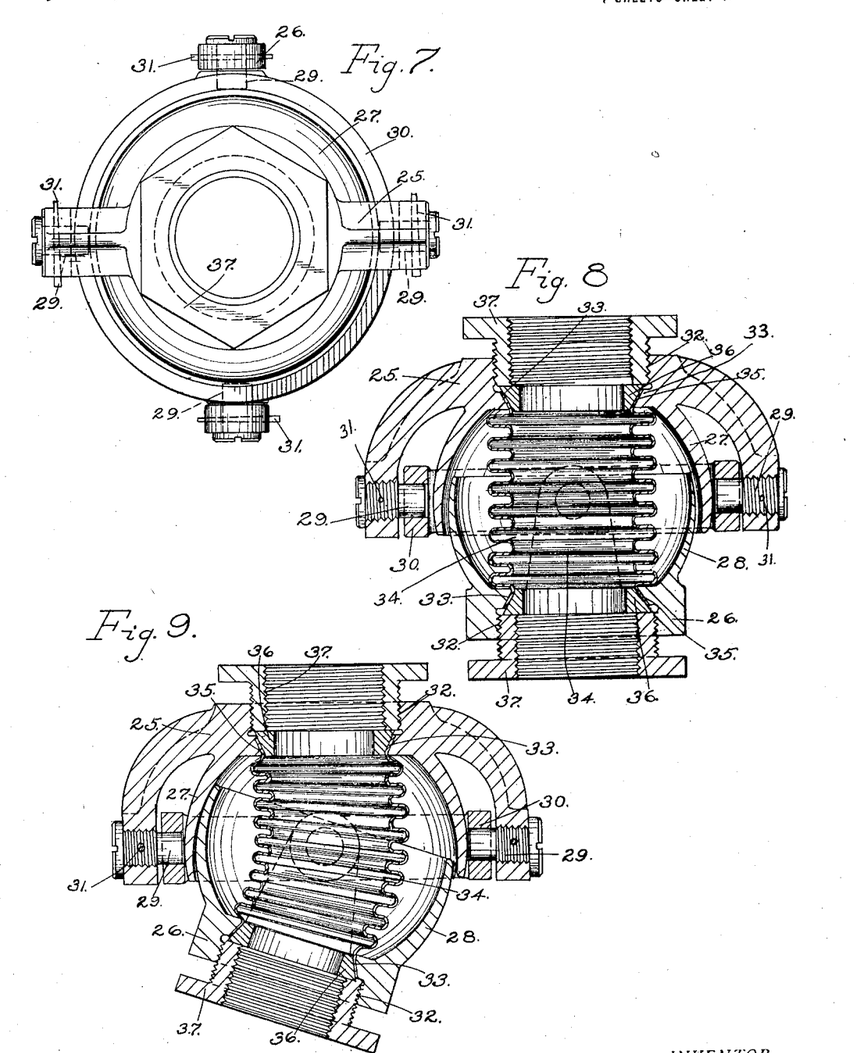
Figs. 7, 8 and 9, illustrate the construction of one of the universal joints forming part of the coupling, Fig. 7 being an end view of the same, Fig. 8, a longitudinal sectional view, and Fig. 9, a similar view showing the joint flexed.

The coupling of my invention, in the embodiment shown, consists of a pair of coengaging coupler heads L, L' of the gravity or Sewall type, provided with elbow pipes M, M', a pair of straight, tubular elements N, N', a pair of universal, or more properly speaking, gimbal joints O, O' connecting the tubular elements N, N' to the end valves C, C', respectively, and a similar pair of joints P, P' connecting the tubular elements N, N' with the elbow pipes M, M' on the coupler heads. The gimbal joints O, O' or P, P' are alike and are preferably constructed so that the pivots of the upper and lower members respectively stand at right angles to each other as shown particularly in Figs. 7 to 9 inclusive. Each joint consists of a pair of yokes 25, 26 arranged at substantially right angles to each other and formed with curved casing members 27, 28 which fit and are movable one within the other. The yokes are pivoted by studs 29 to an annular member 30, the studs being preferably held in place by pins 31. Each of the yokes is formed with an opening, the upper portion of which is threaded, as shown at 32, and the lower portion of which is in the form of a smooth, inwardly inclined or beveled seat 33. The steam passageway through the joint is provided by a flexible, corrugated, metallic, tubular diaphragm 34 which is formed at opposite ends with flaring flanges 35. These flanges are bent so that they will enter the openings in the yokes and are then flattened or pressed out against the seats 33. They are clamped to the seats by means of tapered rings 36 which are forced inwardly by glands 37. The joints O, O' are connected to their respective end valves by unions 38 which are screwed into the end valve and into the upper glands 37. The upper ends of the tubular elements N, N' are screwed into the lower glands 37. The joints P, P' are similarly connected with the tubular elements N, N' and the elbow pipes M, M'.

Figures 10, 12:
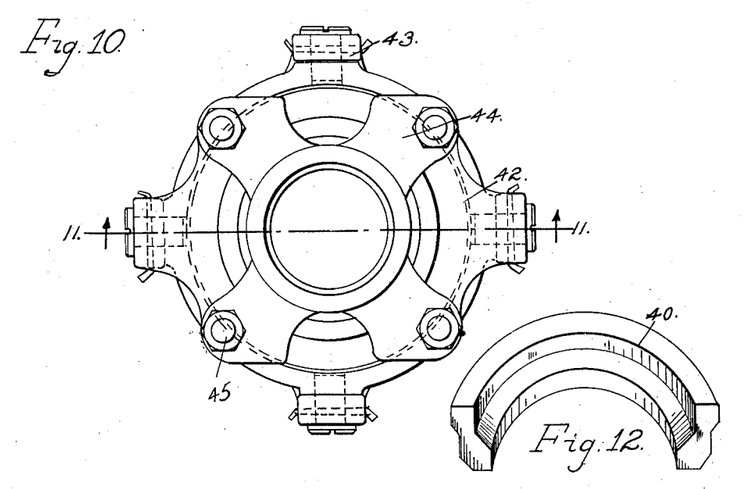
Figs. 10, 11 and 12 illustrate a modified form of joint, Fig. 10 being an end view, Fig. 11, a longitudinal sectional view, and Fig. 12, a view, in perspective, of one-half of one of the two-part clamping rings used for connecting the flexible diaphragm to the members constituting the joint.
Figure 11:
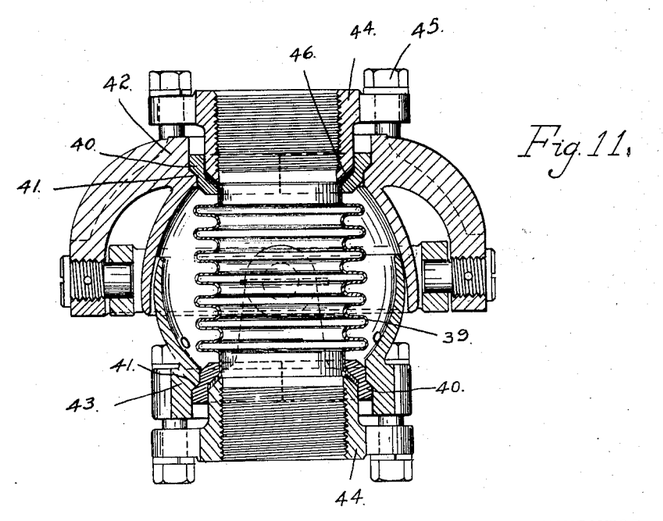

A modified form of joint is shown in Figs. 10 to 12 inclusive. The ends of the diaphragm, designated 39, are clamped against two-part rings 40 which are seated on shoulders 41 formed on the yokes 42, 43, by means of glands 44 bolted to the yokes by bolts 45, lead gaskets 46 being preferably interposed between the flanges on the diaphragm 39 and the beveled ends of the glands 44.

The train pipe coupling above described is strong, durable, steam-tight, sufficiently flexible to accommodate itself to the relative movements of the cars of the train and to permit the coupler heads to be readily coupled and uncoupled in the ordinary manner, and is capable of withstanding the maximum steam pressure to which steam line couplings may be subjected without losing its flexibility. The diaphragms 34 or 39 are so connected with the rigid members of the universal joints as to provide steam-tight passageways through said joints. Being of metal, the diaphragms are capable of withstanding a very high steam pressure. They are relatively thin so as to be flexible. The function of the yokes, casing members 27, 28, and annular member 30 is to take all strain from the diaphragm and protect it from injury. The diaphragms, it will be noted, stand in position only slightly oblique from the vertical so that there is no danger of boiler scale, cinders, or other foreign matter being intercepted and caught in their corrugations. This is an important consideration as it is impossible to keep a steam train line entirely free from particles of solid matter of this sort, and if such foreign matter should lodge in the corrugations of the diaphragm the freedom of movement of the latter would be seriously impaired.

The ordinary rubber hose becomes very stiff when subjected to high pressures. The pressure in a steam train pipe may go as high as one hundred pounds per square inch or even higher. When the hose are made stiff by high pressure the danger of coupler heads being accidentally uncoupled, in rounding a reverse curve, for example, is very much enhanced. The flexibility of the coupling of my invention is very little affected by increase in steam pressure. The diaphragms flex practically as readily with a high pressure fluid within them as if they were empty. Moreover, the flexible structure connecting each coupler head with its end valve and consisting, in each case, of a straight, rigid pipe section united to the end valve with a universal joint and to the coupler head by a universal joint and an elbow pipe, are of such character that they are not readily moved to a position to cause the coupler heads to uncouple even when the distance between the end valves is considerably increased. The structures are not flexible throughout as is the case with a rubber hose, which, when subjected to a flexing stress, is likely to bend at whatever happens to be the weakest point. The coupling of my invention bends only at certain definite points, being otherwise rigid. At the places where the coupling can flex it flexes much more readily than the rubber hose.

Figure 3:
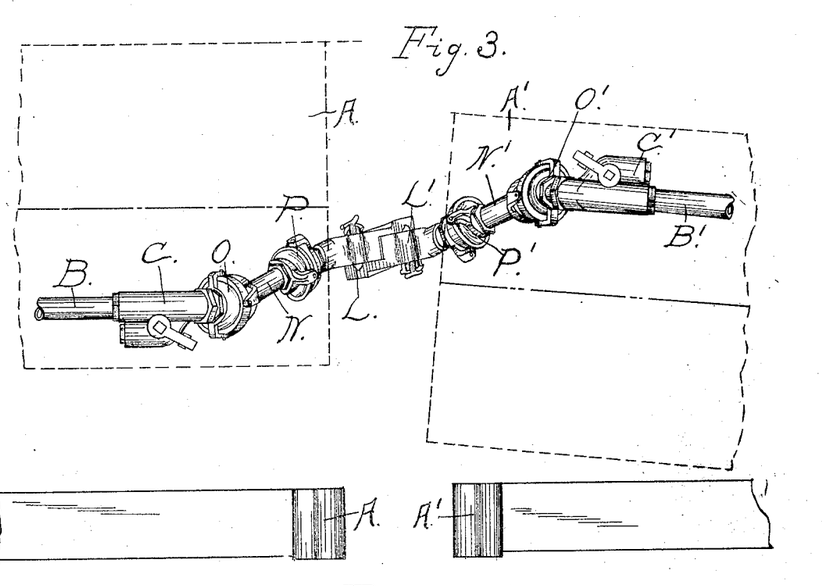
Figs. 3 and 4 are views similar to Figs. 1 and 2, respectively, with the couplings for the air lines omitted, the coupler being shown in the position which it assumes when the distance between the end valves is shortened in rounding a curve.
Figure 4:
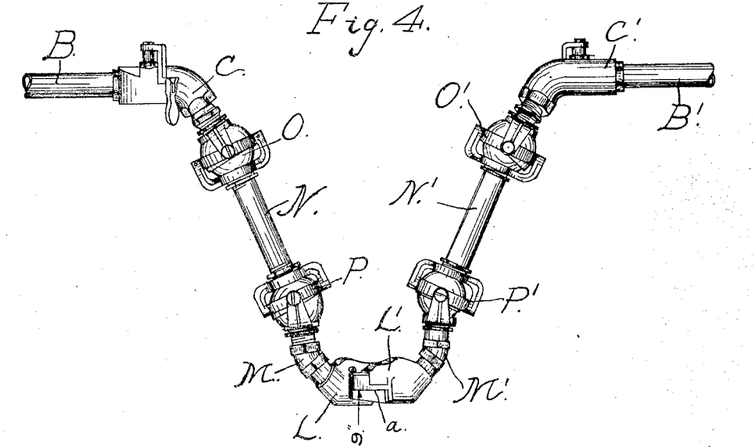
Figure 5:
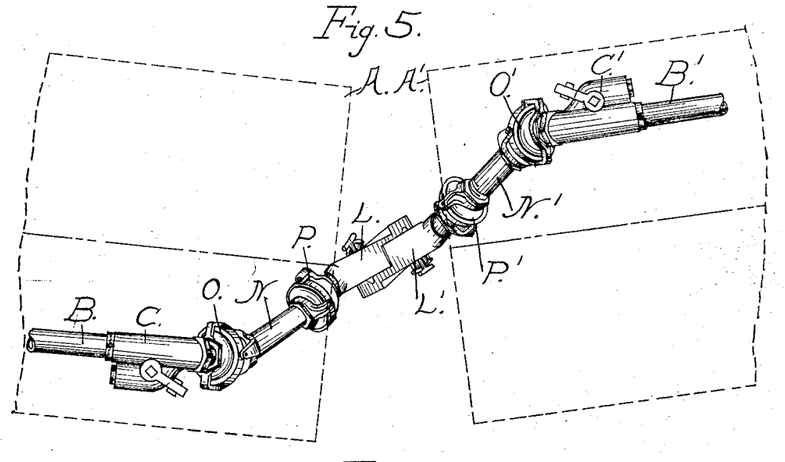
Figs. 5 and 6 are views similar to Figs. 3 and 4, respectively, but with the coupler shown in the position which it assumes when the distance between the end valves is greater than the normal.
Figure 6:
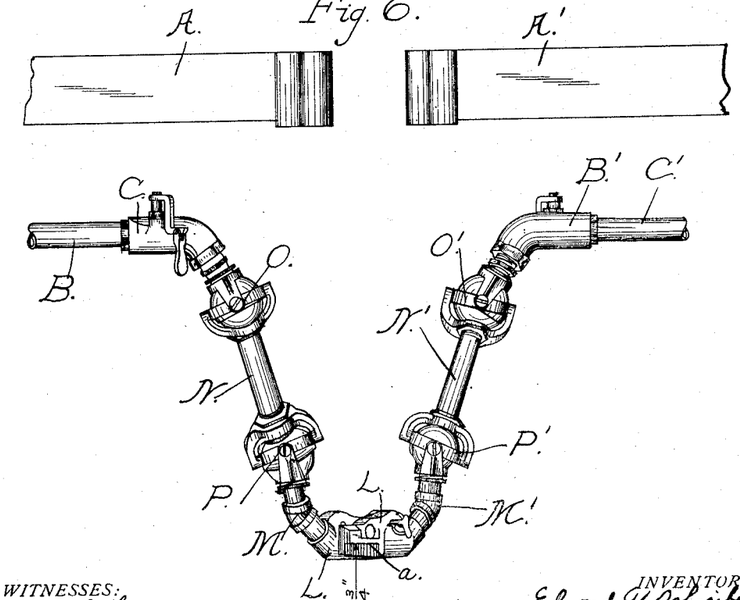

In another respect the metal coupling of my invention is a great improvement over a coupling in which the coupler heads are secured to the end valves by rubber hose. The up and down movement of the coupler heads, due to change of position between the angle valves, is considerably less in my coupling than in the older type. This will be seen by comparison of Figs. 1 and 2 with Figs. 3 and 4 and 5 and 6. The coupling is shown in its normal position in Figs. 1 and 2, that is, the position which it assumes when the cars are in line with each other. On a steam railroad train made up of cars of standard construction the point $a$ on the coupler for the steam line will be, say, nine and five-sixteenths inches above the plane of the top of the rails. Figs. 3 and 4 represent the cars in relative positions shortening the distance between the end valves of the steam line as much as possible under ordinary service conditions. Figs. 5 and 6 represent the ends of the cars in the other extreme position, that is, with the distance between the end valves increased as much as will be possible under ordinary running conditions. In the position of minimum distance between the end valves (Figs. 3 and 4) the point $a$ will be nine inches above the plane of the tops of the rails. In the position of maximum distance between the end valves (Figs. 5 and 6) the distance between point $a$ and the plane of the top of the rails will be nine and three-quarters inches. It will be seen, therefore, that the range of vertical movement of the coupler is three-quarters of an inch. When rubber hose of ordinary weight are used the up and down movement of the coupling is very considerably in excess of this. As a result a steam line coupling, such as is herein shown, is much less liable to interfere with and accidentally uncouple the air line couplers than would be the case if hose were employed.

In Figs. 13 to 16 inclusive, I have shown certain arrangements for holding the coupler head up out of contact with the road-bed when unsupported by engagement with a mating coupler head, for example, as will be the case with the coupling member of the last car of a train. It has been customary, in such cases, to support the coupler head by means of a chain. The trainmen frequently forget to make this attachment and as a result the coupler head is dragged along on the road-bed and injured or destroyed.

Figures 13, 14:
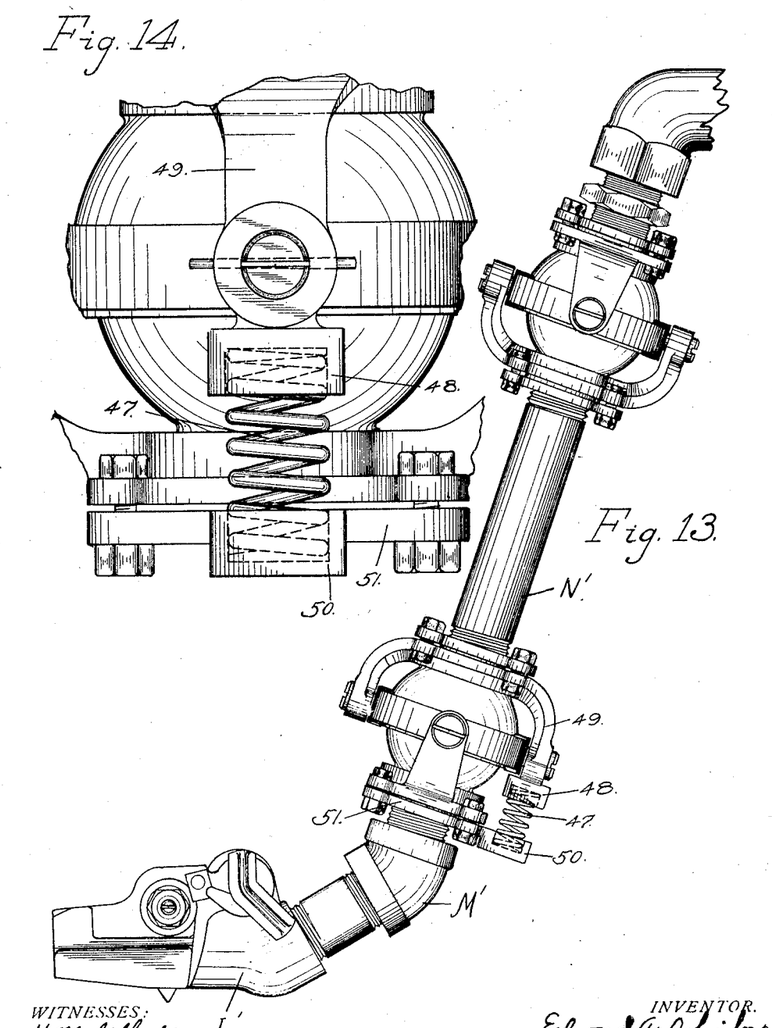
Fig. 13 is a view, in elevation, of a coupling member, that is, the elements of a complete coupling attached to the train pipe of one of the cars, provided with elastic means for keeping the coupler head, when uncoupled, out of contact with the roadbed.
Fig. 14 is a fragmentary elevation of the lower joint of this coupling member on the side of the spring.

In Figs. 13 and 14 a spring 47 is interposed between a spring cup 48 formed on one of the yokes 49 of the lower joint and a spring cup 50 formed on the lower gland 51; the joint being, in other respects, constructed like that shown in Figs. 10 and 11. This spring tends to keep the coupler head in its normal position when uncoupled but will, of course, permit the angular movements of the coupler head necessary in coupling and uncoupling.

Figure 15:
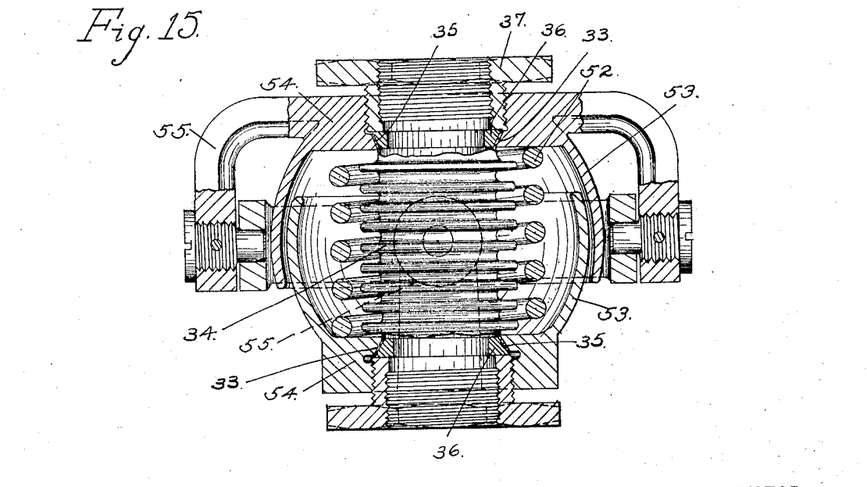
Figs. 15 and 16 are modified joints constructed on the same general principle.

In Fig. 15 a similar result is obtained by arranging a spring 52 within the casing members 53 so that it bears against the heads 54 of the yokes 55. This necessitates increasing the space within the casing members. In other respects the joint is constructed exactly as the one shown in Figs. 7 and 8.

Figure 16:
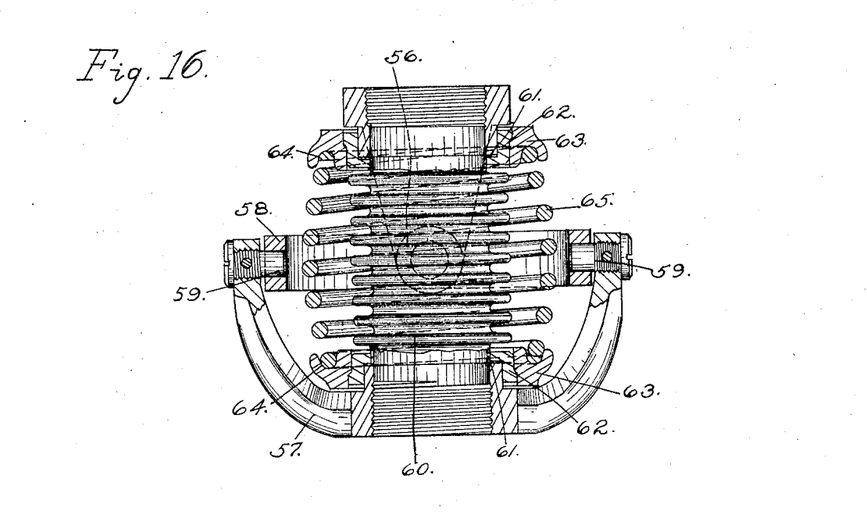

In the joint shown in Fig. 16 yokes 56, 57 are pivoted to an annular member 58 by pivot pins 59 as in the joints previously described. The diaphragm 60 is formed with flanges 61 which are held against the yokes by rings 62. The latter are surrounded and held in position by rings 63 formed with grooves 64 into which are fitted the opposite ends of a helical spring 65 which is greater in diameter at the middle than at the ends. This spring, besides tending to keep the yokes in a certain angular position with respect to each other, serves also as a protection for the diaphragm 60 which it incloses.

Preferably all the cars of a train are equipped with couplers embodying the principles of my invention. However, it will be obvious that a car equipped with couplings embodying the principles of my invention may readily be coupled with a car provided with the ordinary rubber hose coupler, so long as the coupler heads are adapted to co-engage.

While I have described my invention as embodied in certain preferred constructions, it will be understood that modifications might be made without departure from the principles of the invention. Therefore, I do not intend that the invention be limited to the particular constructions, arrangements and devices shown and described except so far as limited by the claims appended hereto.

I claim:

1. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal tubular element, a gimbal joint uniting said train pipe and tubular element, and a second gimbal joint between the other end of the tubular element and the coupler head; each joint having a tubular, metallic, flexible, corrugated diaphragm providing a steam port therethrough.

2. In a railway train pipe, the combination with the train pipe section carried by a car of the train, of a coupling for the same including a coupler head of the gravity type adapted to engage the coupling member carried by the adjacent car of the train, and a jointed structure connecting the coupler head with the train pipe section comprising a substantially straight metal, tubular element, a gimbal joint uniting said train pipe and tubular element, a second gimbal joint at the other end of the tubular element, and an elbow pipe between said joint and coupler-head; each joint having a tubular, metallic, flexible, corrugated diaphragm providing a steam port therethrough.

3. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal tubular element, a gimbal joint uniting said train pipe and tubular element, and a second gimbal joint between the other end of the tubular element and the coupler head; each joint having flexible, metallic means providing a passageway for a fluid under pressure through said joint.

4. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal tubular element, a gimbal joint uniting said train pipe and tubular element, and a second gimbal joint between the other end of the tubular element and the coupler head; and flexible, metallic conduit members providing a passageway for a fluid through the joint, each joint being provided with a pair of substantially hemi-spherical casing members which inclose said conduit members.

5. In a railway train pipe, the combination with the train pipe section carried by a car of the train, of a coupling for the same including a coupler head of the gravity type adapted to engage the coupling member carried by the adjacent car of the train, and a jointed structure connecting the coupler head with the train pipe section comprising a metal tubular element, a universal joint uniting said train pipe and tubular element, and a second universal joint between the other end of the tubular element and the coupler head; each joint being made up of a pair of yokes arranged at right angles to each other formed with casing members, one fitting and movable within the other, an annular member to which said yokes are pivoted, and flexible means providing a fluid passageway through said joint.

6. In a railway train pipe, the combination with the train pipe section carried by a car of the train, of a coupling for the same including a coupler head of the gravity type adapted to engage the coupling member carried by the adjacent car of the train, and a jointed structure connecting the coupler head with the train pipe section comprising a metal tubular element, a universal joint uniting said train pipe and tubular element, and a second universal joint between the other end of the tubular element and the coupler head; each joint being made up of a pair of yokes at right angles to each other formed with casing members, one fitted and movable within the other, and beveled seats, a tubular metallic, flexible, corrugated diaphragm formed at opposite ends with flaring flanges adapted to fit said seats, and means for clamping said flanges against said seats so as to form tight joints.

7. In a railway train pipe, the combination with the train pipe section carried by a car of the train, of a coupling for the same including a coupler head of the gravity type adapted to engage the coupling member carried by the adjacent car of the train, and a jointed structure connecting the coupler head with the train pipe section comprising a metal tubular element, a universal joint uniting said train pipe and tubular element, and a second universal joint between the other end of the tubular element and the coupler head; each joint being made up of a pair of yokes at right angles to each other formed with casing members, one fitted and movable within the other, and beveled seats, a tubular, metallic, flexible, corrugated diaphragm formed at opposite ends with flaring flanges adapted to fit said seats, means for clamping said flanges against said seats so as to form tight joints, and an annular member to which said yokes are pivoted.

8. In a railway train pipe, the combination with the train pipe section carried by a car of the train, of a coupling for the same including a coupler head of the gravity type adapted to engage the coupling member carried by the adjacent car of the train, and a jointed structure connecting the coupler head with the train pipe section comprising a metal tubular element, a universal joint uniting said train pipe and tubular element, and a second universal joint between the other end of the tubular element and the coupler head; each joint being made up of a pair of yokes at right angles to each other formed with casing members, one fitted and movable within the other, and beveled seats, a tubular, metallic, flexible, corrugated diaphragm formed at opposite ends with flaring flanges adapted to fit said seats, beveled clamping rings bearing on the inner surfaces of said flanges, and glands having threaded engagements with said yokes, respectively, to hold said rings in clamping position.

9. In a railway train pipe, the combination with the train pipe section carried by a car of the train, of a coupling for the same including a coupler head of the gravity type adapted to engage the coupling member carried by the adjacent car of the train, and a jointed structure connecting the coupler head with the train pipe section comprising a metal tubular element, a universal joint uniting said train pipe and tubular element, and a second universal joint between the other end of the tubular element and the coupler head; each joint being made up of a pair of yokes at right angles to each other formed with casing members, one fitted and movable within the other, beveled seats, a tubular, metallic, flexible, corrugated diaphragm formed at opposite ends with flaring flanges adapted to fit said seats, beveled clamping rings bearing on the inner surfaces of said flanges, glands having threaded engagements with said yokes, respectively, to hold said rings in clamping position, and an annular member to which said yokes are pivoted.

10. In a railway train pipe, the combination with the train pipe section carried by a car of the train, of a coupling for the same including a coupler head adapted to engage the coupling member carried by the adjacent car of the train, an elbow pipe connected with said coupler head, a straight tubular element, and universal joints between the elbow pipe and the tubular element and between the tubular element and the train pipe section, said joints comprising in each case yokes arranged at right angles to each other, an annular member to which the yokes are pivoted, a flexible member connected with the yokes so as to provide a fluid-tight port through the joint, and protecting means surrounding said flexible member.

11. In a coupling member for a railway train pipe, the combination with rigid elements having a normal angular relationship with each other and means providing a universal joint between the same, of elastic means tending to hold said rigid elements in their normal angular relationship with each other when said coupling member is uncoupled.

12. In a coupling member for a railway train pipe, the combination with rigid elements having a normal angular relationship with each other, of means providing a universal joint between the same comprising a spring which tends to keep said rigid elements in their said normal angular relationship with each other when said coupling member is uncoupled.

13. In a coupling member for a railway train pipe, the combination with a coupler head, of a tubular element having a normal angular relationship with said coupler head, a universal joint connecting the coupler head with the tubular member and comprising a spring which tends to maintain the said normal angular relationship between the coupler head and the tubular member when the coupler head is not engaged with the mating head of another coupling member.

14. In a coupling member for a railway train pipe, the combination with a tubular element, of a coupler head and a joint connecting the same comprising a pair of yokes, an annular member to which the yokes are pivoted, and a spring interposed between said yokes which tends to maintain a certain angular relationship between said yokes.

15. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal tubular element, a gimbal joint uniting said train pipe and tubular element, and a second gimbal joint between the other end of the tubular element and the coupler head; each joint having a tubular, metallic, flexible, corrugated diaphragm providing a steam port therethrough, and protecting means comprising a pair of substantially hemispherical casing members one extending into the other which are imperforate, except to provide said steam port, so as to completely inclose said diaphragm.

16. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal tubular element, a gimbal joint uniting said train pipe and tubular element, and a second gimbal joint between the other end of the tubular element and the coupler head; each joint being made up of substantially hemispherical casing members, one fitting and movable within the other, and each provided with a yoke, a ring to which the yokes are pivoted at right angles to each other, and a flexible metallic conduit member providing a passageway for a fluid through the joint, said casing members being imperforate except to provide for said fluid passageway so as to completely inclose the conduit member.

17. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal tubular element, a universal joint uniting said train pipe and tubular element, and a second universal joint between the other end of the tubular element and the coupler head; each joint being made up of a pair of yokes arranged at right angles to each other formed with casing members, one fitting and movable within the other, an annular member to which said yokes are pivoted, and flexible means providing a fluid passageway through said joint, said casing members being formed so that they completely inclose and protect said flexible means.

EDWARD A. SCHREIBER.

Witnesses:
L. A. FALKENBERG,
H. M. HUTCHINGS.